US012589876B2

(12) United States Patent
Galindo-Lopez

(10) Patent No.: US 12,589,876 B2
(45) Date of Patent: Mar. 31, 2026

(54) AIRCRAFT COMPONENT WITH A SURFACE EXPOSED TO AN AMBIENT AIR-FLOW AND A HEAT TRANSFER DEVICE AND A METHOD FOR OPERATING A HEAT TRANSFER DEVICE WITH A AIRCRAFT COMPONENT

(71) Applicant: Rolls-Royce Deutschland Ltd & Co KG, Blankenfelde-Mahlow (DE)

(72) Inventor: Carlos Hannover Galindo-Lopez, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 128 days.

(21) Appl. No.: 18/430,383

(22) Filed: Feb. 1, 2024

(65) Prior Publication Data

US 2024/0262510 A1    Aug. 8, 2024

(30) Foreign Application Priority Data

Feb. 2, 2023    (DE) ..................... 10 2023 102 640.2

(51) Int. Cl.
*B64D 13/06* (2006.01)
*F02C 7/18* (2006.01)

(52) U.S. Cl.
CPC .............. *B64D 13/06* (2013.01); *F02C 7/185* (2013.01); *F05D 2260/213* (2013.01)

(58) Field of Classification Search
CPC ... B64D 13/06; F20C 7/141; F05D 2260/213; F02C 7/185

USPC .......................................................... 165/51
See application file for complete search history.

(56) References Cited

U.S. PATENT DOCUMENTS

| | | | |
|---|---|---|---|
| 10,011,362 B2 | 7/2018 | Piesker | |
| 11,149,643 B2 * | 10/2021 | Schwarz | ................ F02C 7/141 |
| 2009/0272854 A1 | 11/2009 | Violett | |
| 2010/0326049 A1 | 12/2010 | Schmittenberg | |
| 2011/0146957 A1 | 6/2011 | Buchholz | |
| 2016/0159466 A1 | 6/2016 | Daggett | |
| 2017/0167382 A1 | 6/2017 | Miller | |
| 2018/0347468 A1 | 12/2018 | Caimano | |

(Continued)

FOREIGN PATENT DOCUMENTS

| | | |
|---|---|---|
| DE | 686218 C | 1/1940 |
| DE | 3446205 A1 | 7/1985 |
| DE | 3812739 C1 | 7/1989 |

(Continued)

OTHER PUBLICATIONS

German Search Report dated Dec. 12, 2023 from counterpart German App No. 102023102640.2.

*Primary Examiner* — Davis D Hwu
(74) *Attorney, Agent, or Firm* — SHUTTLEWORTH & INGERSOLL, PLC; Timothy J. Klima

(57) ABSTRACT

The invention relates to an aircraft component, in particular an aircraft gas turbine, having a face which can be flowed over or around by ambient air, in particular a housing of the aircraft gas turbine and a heat exchange apparatus having at least one heat exchange face, characterized in that the at least one heat exchange face is arranged on or in the face in such a manner that it is in contact with the ambient air. The invention further relates to a method for operating heat exchange apparatuses.

22 Claims, 5 Drawing Sheets

(56)                       References Cited

U.S. PATENT DOCUMENTS

| | | |
|---|---|---|
| 2020/0010208 A1 | 1/2020 | Peace |
| 2022/0020004 A1 | 1/2022 | Jamkhedkar |

FOREIGN PATENT DOCUMENTS

| | | |
|---|---|---|
| DE | 102006046114 A1 | 4/2008 |
| DE | 102011101342 A1 | 11/2012 |
| DE | 102018116146 A1 | 1/2020 |
| DE | 102018116155 A1 | 1/2020 |

* cited by examiner

FIG 4
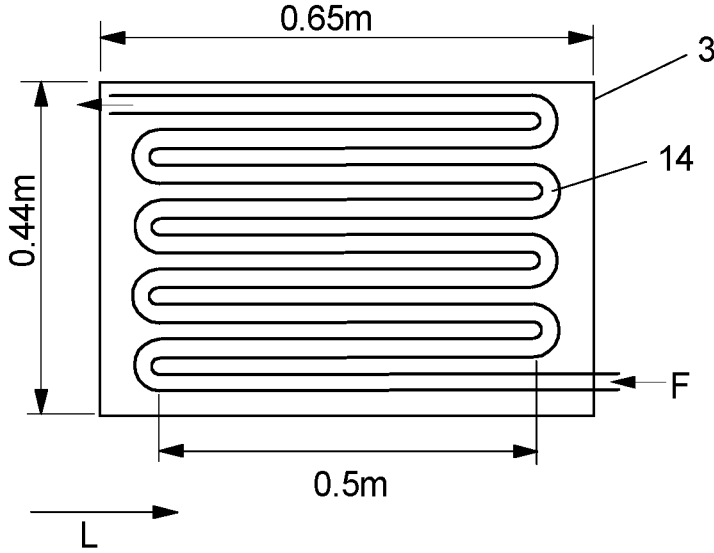
FIG 4A
FIG 5
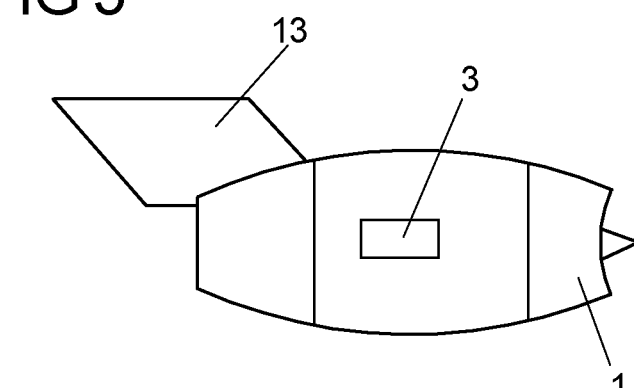
FIG 6
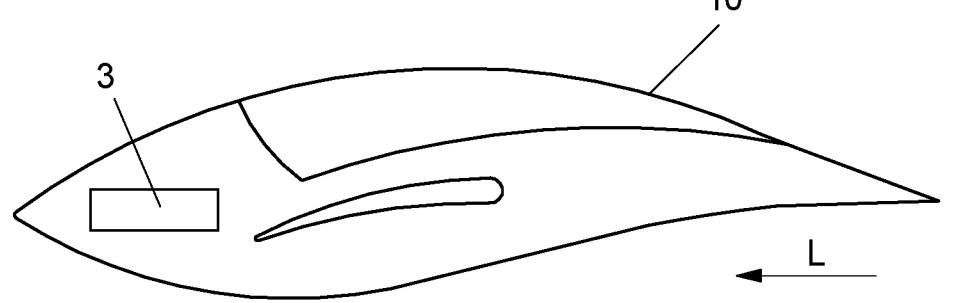

AIRCRAFT COMPONENT WITH A SURFACE EXPOSED TO AN AMBIENT AIR-FLOW AND A HEAT TRANSFER DEVICE AND A METHOD FOR OPERATING A HEAT TRANSFER DEVICE WITH A AIRCRAFT COMPONENT

In an aircraft there are many aircraft components, such as, for example, an aircraft gas turbine, having units, such as, for example, electronic subassemblies, which have to be cooled during operation.

US 2018/347468 A1 discloses, for example, a heat exchanger in a housing of an aircraft gas turbine. US 2022/020004 A1 discloses a heat exchanger which is arranged in a bypass channel of an aircraft gas turbine.

An object is to provide aircraft components with efficient cooling means.

According to a first aspect, an aircraft component, in particular an aircraft gas turbine, having a face which can be flowed over or around by ambient air and having a heat exchange apparatus having at least one heat exchange face is provided. In this instance, the at least one heat exchange face is arranged on or in the face in such a manner that it is in contact with the ambient air (external air). The face may, for example, be part of an external face of an aircraft or an aircraft gas turbine. Thus, heat which is intended to be discharged can be guided to the at least one heat exchange face so that, for example, when the aircraft is in flight, the heat exchange face can be cooled convectively by the ambient air. The heat exchange face may additionally or alternatively discharge heat via radiation to the environment.

In one embodiment, the at least one heat exchange face terminates flush with the surrounding face and/or it is free from means for increasing the heat exchange face. This means that the at least one heat exchange face is configured in a flat manner. In this case, the at least one heat exchange face may have the same curvature and/or surface structure as the surrounding face so that it is integrated therein.

In another embodiment, the face is in the form of a housing which surrounds a bypass channel of the aircraft gas turbine, wherein the at least one heat exchange apparatus is arranged in the housing of the aircraft gas turbine, but not necessarily in the region of the bypass channel.

In one embodiment, the at least one heat exchange face may be arranged in the housing of an aircraft gas turbine axially between an inlet region and a thrust reversal region. This may include, for example, the region of the housing which surrounds the bypass channel.

However, the at least one heat exchange face may also be part of the external wall of an aircraft, in particular an electrically driven aircraft.

The at least one heat exchange face may in this case be integrated particularly in a region of the face, particularly of the housing, which is formed from composite material. Composite materials per se generally do not have good thermal conduction properties so that the arrangement of determined heat exchange faces is advantageous. The at least one heat exchange face may also have aluminium, copper and/or magnesium or be formed from these materials. These metals have a relatively high thermal conduction coefficient.

In another embodiment, the at least one heat exchange apparatus has at least one channel for a fluid, wherein the at least one channel is thermally coupled to the at least one heat exchange face. The heated fluid guides the heat from a unit which is located within the face (that is to say, at the side, facing away from the ambient air, of the face), in particular from a unit inside the aircraft gas turbine, to the heat exchange face and the fluid which is accordingly cooled after the, for example, convective cooling, back again. In this case, the at least one channel may be arranged in an axial direction of the aircraft gas turbine so that the ambient air flows along the axial extent of the channel. The heat exchange apparatus may also be in the form in the at least one channel of a counter-current heat exchanger or cross-flow heat exchanger, which allows a particularly efficient heat exchange.

The fluid which the heat transports to the heat exchange face may be, for example, an oil, a lubricant, a coolant or a fuel.

If, in one embodiment, the at least one channel has a rectangular cross section, in particular with a ratio of the height to the width between 1:2 and 1:10, the wide side of the relatively flat channel can then be directed towards ambient air.

In one embodiment, the heat exchange apparatus is coupled for cooling to at least one electric and/or electronic unit in the aircraft gas turbine and/or in the aircraft since the heat has to be discharged from the at least one unit. The at least one unit may in this case have an apparatus, for example, for variable frequency energy supply.

In order to limit heating of the interior of the aircraft gas turbine, the heat exchange apparatus may have a thermal insulation means with respect to the region which is located inside the face, in particular the interior of the housing.

For advantageous heat discharge, the size of the at least one heat exchange face may be between 0.07 and 0.30 m².

It is also possible for the heat exchange apparatus to be thermally coupled to an additional heat exchange apparatus within the face (that is to say, at the side, facing away from the ambient air, of the face). In this case, this additional heat exchange apparatus is in particular independent of the state outside the face (that is to say, the state at the side, facing the ambient air, of the face). In this case, with a control apparatus the heat exchange can be adjusted by the heat exchange apparatus and the additional heat exchange apparatus in accordance with an operating parameter of the aircraft, particularly the speed of the aircraft.

In another embodiment, the at least one heat exchange face is thermally coupled to a secondary circuit of a second fluid which is thermally coupled to a primary circuit with a first fluid via a second heat exchange apparatus. The primary circuit can consequently be used to control the temperature of units in the aircraft gas turbine and/or in the aircraft. By using two circuits, particularly two different fluids can be used, wherein only one of them is thermally coupled to the heat exchange face.

The problem is also solved by a method having features as disclosed herein.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

EXEMPLARY EMBODIMENTS WILL NOW BE DESCRIBED WITH REFERENCE TO THE FIGURES, IN WHICH

FIG. 4 shows a detailed illustration of one embodiment of a heat exchange apparatus;

FIG. 4A shows a sectioned view through a portion of the pipe arrangement in the embodiment according to FIG. 4;

FIG. 5 shows another embodiment of a heat exchange face on an aircraft gas turbine as an aircraft component;

FIG. 6 shows another embodiment with a heat exchange face at the outer side of an aircraft;

Figures 1, 1A, 1B:
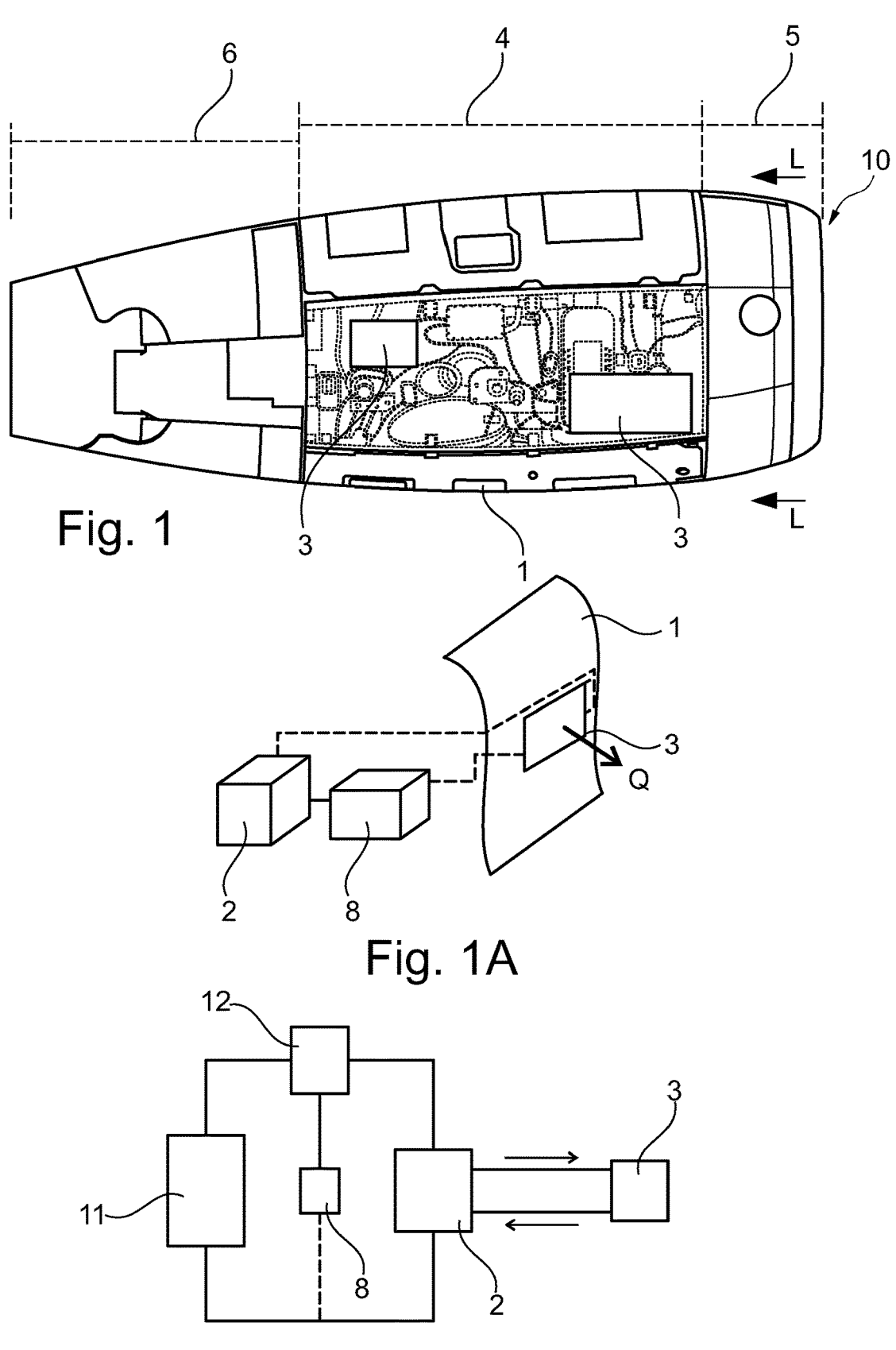
FIG. 1 shows a schematic side view of one embodiment of an aircraft gas turbine with heat exchange faces in the housing of the aircraft gas turbine.
FIG. 1A shows a schematic illustration of one embodiment of a heat exchange apparatus in an aircraft gas turbine.
FIG. 1B shows a schematic illustration of one embodiment of a heat exchange apparatus in conjunction with an additional heat exchange apparatus.

FIG. 1 illustrates a side view of an aircraft gas turbine 10 which is known per se. During operation, ambient air L flows past the aircraft gas turbine 10, that is to say, a housing 1 of the aircraft gas turbine 10 is flowed around by ambient air L. Ambient air L also flows through an inlet region 5 into the aircraft gas turbine 10. The proportion of ambient air L which is introduced into the aircraft gas turbine 10 and which generates the thrust at that location in known manner is not significant below. The aircraft gas turbine 10 is generally arranged under a wing which is not illustrated for reasons of clarity. As will be made clear below (see, for example, FIGS. 5 to 7), the aircraft gas turbine 10 is only an example of an aircraft component.

The aircraft gas turbine 10 is surrounded by the housing 1 which protects the units which are located inside (for example, turbine stages, compressor stages, electronic units for control, lines, secondary air guidance systems, etc.) from external effects.

In this case, the housing portion 4 is located axially behind the inlet region 5 around the bypass channel inside the aircraft gas turbine 10 which is not illustrated here, however. The thrust reversal region 6 of the housing 1 is then also located axially therebehind.

Since, however, a number of units 8, such as, for example, electric or electronic units, develop heat during operation to a considerable extent or are exposed to heat sources, an efficient cooling of these units 8 is important, which is described in greater detail in connection with FIGS. 1A and 1B. These units 8 are particularly—but not exclusively—arranged inside the housing portion 4 which surrounds the bypass channel, which cannot be seen here, of the aircraft gas turbine 10.

In this instance, two heat exchange faces 3 which are coupled inside the aircraft gas turbine to a heat exchange apparatus 2 are arranged at the outer side of the housing portion 4 which surrounds the bypass channel, which is illustrated in FIGS. 1A and 1B.

The heat exchange faces 3 are integrated in the housing 1 in a flush manner, that is to say, the flow resistance is not increased during flight, for instance, by ribs or other elements for increasing the heat exchange face 3. The heat exchange faces 3 have a curvature in an axial extent and/or radial extent which corresponds to the curvature at the respective location of the housing 1. The heat exchange faces 3 are in the form of rectangles here but may in other embodiments also have rounded edges and/or more complex shapes. Only one heat exchange face 3 may also be used or more than two heat exchange faces 3 can also be used.

In order to improve the heat transmission, the heat exchange faces 3 are made from aluminium, copper and/or magnesium or have these materials.

Typically, heat exchange faces 3 with sizes between 0.07 and 0.25 m² can be used, wherein the size and shape can be adapted to the cooling function.

In any case, the heat exchange faces 3 are flowed over by the ambient air during operation so that the faces are cooled in a correspondingly convective manner. Since the flow passage speed during flight is high, an efficient cooling can be carried out in this case. In principle, it is the case that the convective heat transmission increases with an increasing flow passage speed. Since the ambient air L is very cold at great flight heights, the heat transmission effect is further increased.

In FIG. 1A, a portion of the housing in which a heat exchange face 3 from which a thermal flow Q is convectively discharged is arranged is schematically illustrated on the right.

Inside the aircraft gas turbine 10, a unit 8 which discharges heat and which therefore has to be cooled is schematically illustrated here. In modern aircraft, for example, increasingly generators are used for variable frequency energy supply (Variable Frequency Generators VFG) and have a powerful cooling requirement. Such a VFG may be the unit 8 which is intended to be cooled in this instance.

A heat exchange apparatus 2 which is illustrated as a separate unit for reasons of clarity ensures that a fluid (for example, oil) is taken up by the unit 8 and is guided to the heat exchange face 3 so that the convective cooling can be carried out at that location. In this case, the fluid to be cooled and the air flow of the ambient air L can move in countercurrent relative to each other. In principle, a parallel flow or cross-flow would also be possible.

In principle, it is also possible for a plurality of units 8 to be flowed through by a fluid so that more complex arrangements and cooling networks are also possible.

FIG. 1B illustrates another embodiment of a heat exchange apparatus 2 with a heat exchange face 3 in a housing 1.

In principle, additional heat exchange apparatuses 11 which do not have heat exchange faces in or on the housing 1 may also be arranged inside the aircraft gas turbine 10. These additional heat exchange faces 11 accordingly do not have any direct contact with the ambient air L.

Thus, for example, it is possible for these additional heat exchange apparatuses 11 to be coupled thermally to an air flow inside the aircraft gas turbine 10. They may also provide active cooling if the aircraft gas turbine 10 is not operating or if it is moving at only a low speed.

A control device 12 (for example, in the form of a process computer) may, for example, bring about up to a specific speed of the aircraft gas turbine 10 (and/or up to a relevant temperature of the unit or the fluid) active cooling of the unit 8 via the additional heat exchange apparatus 11. This could be, for example, during movements on the ground and during take-off.

Figure 3:
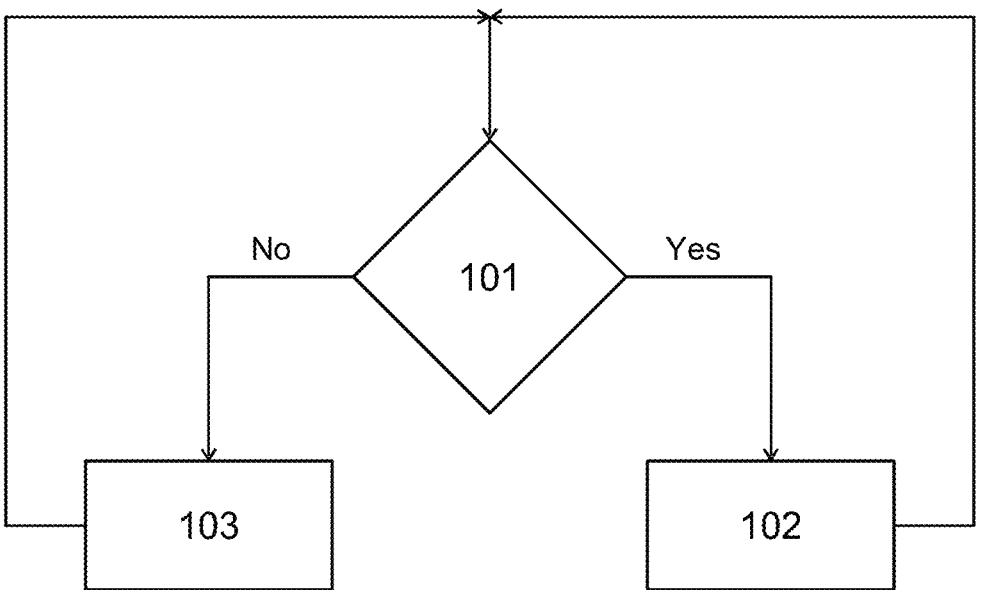
FIG. 3 shows a flow diagram for describing an embodiment of a method for operating heat exchange apparatuses in an aircraft gas turbine.

If a specific speed of the ambient air L relative to the heat exchange face 3 is reached (for example, more than Ma=0.2), that is to say, when a sufficiently great convective heat transmission is possible, then the control apparatus 12 switches over to the heat transmission apparatus 2 which is coupled to the heat exchange face 3 in the housing 1. During landing, that is to say, when the speed becomes lower again, the operation would be reversed. FIG. 3 illustrates this as a flow chart.

Figure 2A:
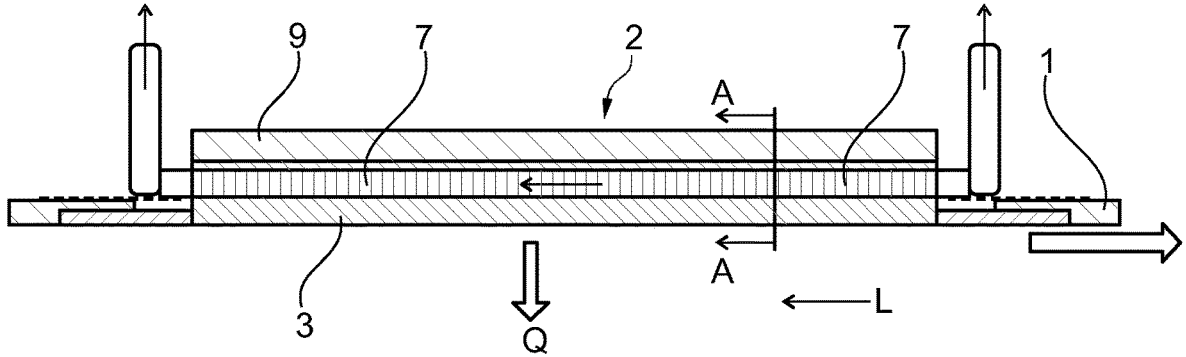
FIG. 2A shows a first schematic sectioned view through one embodiment of a heat exchange apparatus with a heat exchange face.
Figure 2B:
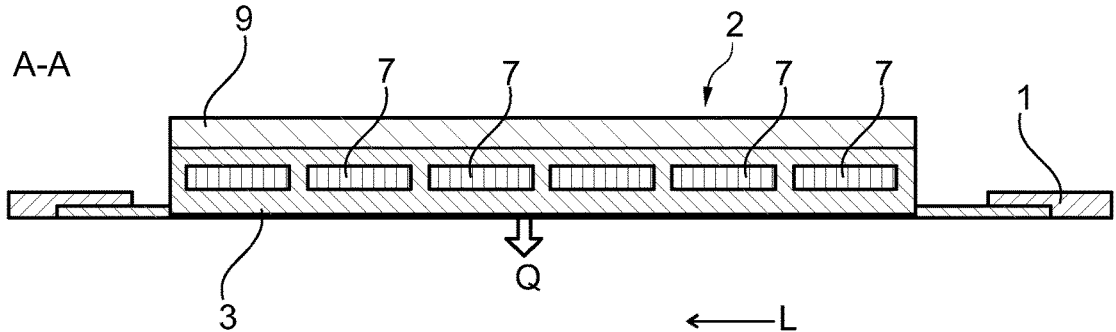
FIG. 2B shows a second schematic sectioned view through the embodiment according to FIG. 2A.

FIGS. 2A and 2B illustrate a sectioned view through a heat exchange apparatus 2 with a heat exchange face 3. FIG. 2A illustrates a sectioned view in an axial direction of the aircraft gas turbine 10. During flight, the ambient air L flows from right to left along the housing and therefore also over the planar heat exchange face 3. In the Figure, this corresponds to the flight direction which is denoted by an arrow.

In the sectioned view, there is a channel 7 for a fluid, in this case oil, which flows in the axially front region into the channel 7 at a high temperature and which is guided in the axially rear region at a lower temperature inside the aircraft gas turbine 10 again (not Illustrated here). The fluid consequently absorbs heat at a unit 8 which is not illustrated here and is then fed into the channel 7 and guided to the heat exchange face 3. The heat flow Q is removed from the fluid by the ambient air L which convectively cools the heat exchange face 3 so that the cooled fluid can be used again to cool a unit 8.

In an alternative embodiment, fuel can also be used as the fluid which is used to cool a unit 8 in the aircraft gas turbine 10.

FIG. 2B illustrates the embodiment according to FIG. 2A as a sectioned view A-A. As a result, it can be seen that a plurality of channels 7 are arranged in a parallel manner here. The channels 7 each have a rectangular, planar cross section so that each channel has a relatively large surface-area relative to the heat exchange face 3. A cross section may have, for example, a ratio of height H to the width of from 1:3 to 1:10. With this planar construction type, the channels 7 in the region of the heat exchange face 3 can be readily integrated in the wall of the housing 1.

In alternative embodiments, the channels 7 may have a round, elliptical or polygonal cross section. It is also possible for the channels not to be in the form of individual, parallel channels. Thus, for example, a meandering channel 7 or a plurality of meandering channels 7 may be used.

The objective of the heat exchange apparatus 2 is to discharge as much heat Q as possible via the heat exchange face 3 to the ambient air L. In order to minimise a heat exchange with the interior of the aircraft gas turbine 10, the heat exchange apparatus 2 has a thermal insulation layer 9 at the side which is directed towards the interior of the aircraft gas turbine 10. This thermal insulation layer 9 ensures that an exchange of heat Q takes place primarily with the ambient air L via the heat exchange face 3 and not, for example, with the interior of an aircraft gas turbine 10 (cf. FIG. 1, for example).

The thermal insulation layer may, for example, comprise a layer composed of a porous material. Such a layer is a poor conductor of heat.

In principle, plastics (possibly encased with fire protection) with a low thermal coefficient of conductivity may be suitable for insulation purposes. Plastics may, for example, also be foamed using a gas (air, $CO_2$, or some other foaming agent), which reduces the thermal conductivity.

If this layer is constructed from metal foam, or comprises metal foam, for example, said layer would also be fireproof.

In principle, however, other thermally insulating materials or else a material composite are/is also suitable for ensuring thermal insulation.

Moreover, in one embodiment, the heat exchange apparatus 2 may be designed to be fire-resistant. This ensures that an exchange of heat Q is possible, for example, even in the event of damage.

FIG. 3 schematically shows the implementation of a method in which a control apparatus 12 (see FIG. 1B) in a first step 101 detects an operating parameter, such as, for example, the flight speed (v<0.2 Ma). If it is too low, in a second step 102 an additional heat exchange apparatus 11 which does not have the ambient air L as a heat sink is switched on. Subsequently, it is again checked (step 101) whether the condition placed on the operating parameter is complied with.

If the speed is, for example, greater than 0.2 Ma, the control apparatus 12 switches over in a step 103 to the heat exchange apparatus 2 which is coupled to the heat exchange face 3. Subsequently, it is again checked whether the condition placed on the operating parameter is complied with.

FIG. 4 illustrates a detail of a plan view of a heat exchange apparatus 2 which is arranged under a heat exchange face 3 which cannot be seen here The flow of the ambient air L may be assumed to be from left to right in this case.

The heat exchange apparatus 2 has a pipe coil 14 (that is to say, a meandering, elongate hollow member) which is configured in a planar manner and which is arranged under the heat exchange face 3. As illustrated in the cross sectional view of FIG. 4A, the cross section of the pipe coil 14 is rectangular. The thickness of the pipe is 1 cm, the width is 3 cm. The spacing between two turns is 2 cm. The dimensions and shapes are intended to be understood only by way of example in this instance. Other embodiments may have other dimensions and/or other cross selectional shapes.

From the right, a hot fluid F flows into the pipe coil 14 so that in the first linear portion of the pipe coil 14 the fluid F is in counter-current to the ambient air L; this is a convective example of a possible contact of the heat exchange face 3 with the ambient air L. The heat of the fluid F which flows through the pipe coil 14 is discharged via the heat exchange face 3 to the ambient air L so that the cooled fluid F is discharged again in the top left position in the illustration of FIG. 4.

In the embodiment illustrated here, the linear portions of the pipe coil 14 have a length of 0.5 m. The heat exchange face 3 which is thermally coupled to the pipe coil 14 has a surface-area of 0.44 m×0.65 m=0.286 m². In other embodiments, other shapes, other arrangements of the pipelines 14 and/or other dimensions are also possible in this instance.

FIG. 5 illustrates a side view of an aircraft gas turbine 10 which is arranged via a pylon 13 on a wing, which is not illustrated here in greater detail, of an aircraft. A rectangular heat exchange face 3 is arranged on the side wall of the aircraft gas turbine 10. It is arranged axially between the inlet region 4 and the thrust reversal region 6.

Embodiments are illustrated above with reference to an aircraft gas turbine 10. However, the application of the teaching described here is not limited to aircraft gas turbines but instead may generally be applied to aircraft components 10, such as, for example, housings, parts of an external wall, etc., if the aircraft component is in contact with the ambient air L (that is to say, external air, not air inside the aircraft).

FIG. 6 illustrates a side view of an aircraft, the external wall of which is in the form of an aircraft component 10. During flight, the ambient air L flows from the right against the aircraft. A heat exchange face 3, via which the heat is discharged in the manner already described above to the ambient air L is arranged on the external wall 10 here.

Figure 7:
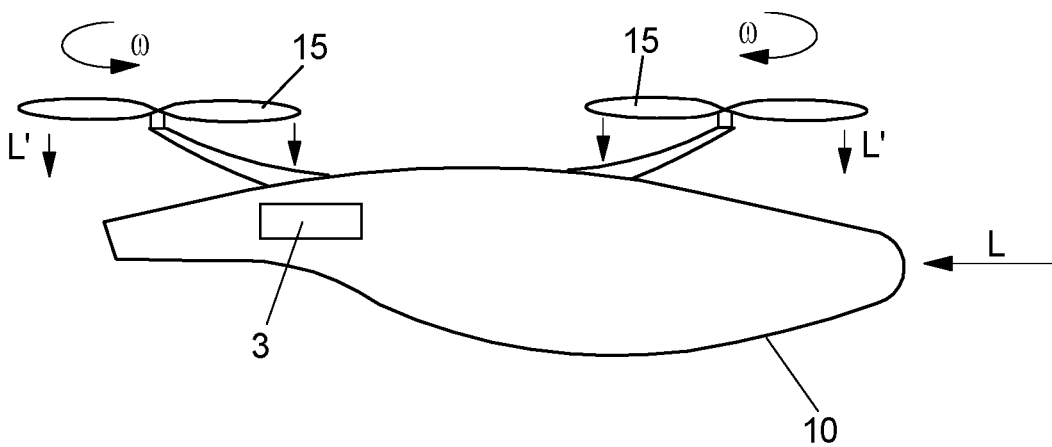
FIG. 7 shows another embodiment with a heat exchange face at the outer side of an electrically driven aircraft.

FIG. 7 illustrates a modification of the embodiment according to FIG. 6. In this instance, the ambient air L also flows during flight around the external wall 10 of the aircraft, on which a heat exchange face 3 is arranged. The aircraft is illustrated here as an electric aircraft, wherein the drive is carried out via propellers, of which two are illustrated here.

In addition to a convective cooling action by the ambient air L, in this instance a convective cooling by the downwardly flowing air flow L' which is generated by the propellers 15 is carried out here. In this case, the heat exchange face 3 is arranged in the flow path of the downwardly acting air flow L1 of the rear propeller 15. In principle, a plurality of heat exchange faces 3 can also be arranged on the external wall 10 so that the downstream of the propellers 15 can be exploited at a number of locations.

Figure 8:
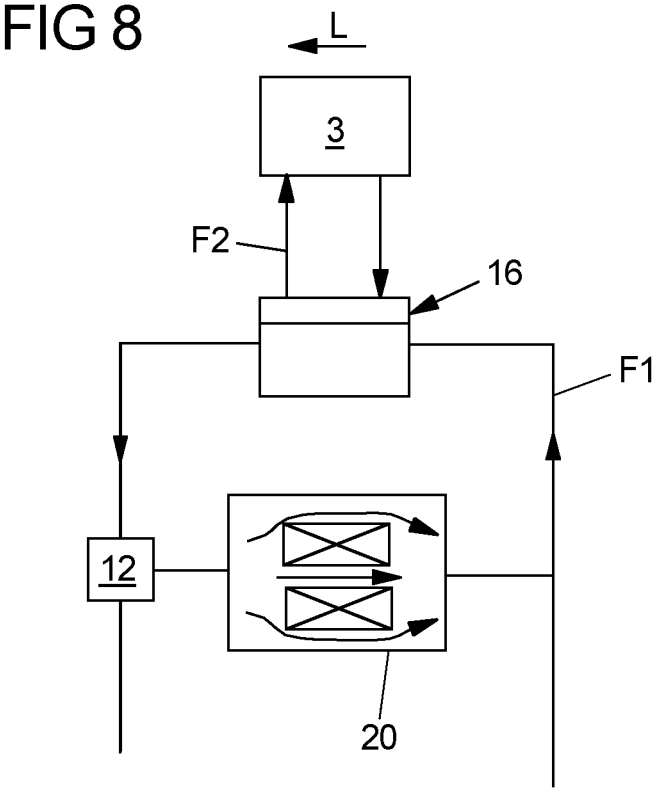
FIG. 8 shows another embodiment of an apparatus with a control apparatus.

FIG. 8 illustrates a detail of an additional embodiment which relates to an electric system or battery system 20 which is intended to be cooled with an electrically non-conductive fluid F1 (first fluid). In the event of a VFG, it may be a coolant.

If this cooling fluid A cannot reach the heat exchange face 3 for specific reasons, for example, for reasons of safety, the heat exchange apparatus 2 can act as a reservoir for a second fluid F2 which is in heat exchange with the actual cooling fluid A. In FIG. 8, the exchange takes place between the cooling fluid F1 (that is to say, the first fluid) and the second fluid F2 in a second heat exchange apparatus 16.

As a result, the second fluid F2 absorbs heat from the first fluid F1 in the second heat exchange apparatus 16 and transmits it via the heat exchange face 3 to the ambient air L and is then pumped again to the second heat exchange apparatus 16.

The cooled first fluid F2 can now cool the electric system 20 (for example, a battery apparatus) before the second fluid F2 which is then heated up is again guided to the second heat exchange apparatus 16.

Consequently, two circuits are present here, a primary circuit with the first fluid F1 and a secondary circuit with the second fluid F2, wherein the second fluid is in contact with the heat exchange face 3. The optional control apparatus 12 may control the switching of the circuits.

It will be understood that the invention is not limited to the above-described embodiments and different modifications and improvements can be carried out without deviating from the concepts described here. Any of the features may be used separately or in combination with any other features, unless they are mutually exclusive, and the disclosure extends to and includes all combinations and subcombinations of one or more features which are described here.

LIST OF REFERENCE SIGNS

1 Face, housing of an aircraft gas turbine, which can be flowed around by ambient air
2 Heat exchange apparatus
3 Heat exchange face
4 Housing portion surrounding bypass channel of the aircraft gas turbine
5 Inlet region of the aircraft gas turbine
6 Thrust reversal region of the aircraft gas turbine
7 Channel for fluid
8 Electronic/electric unit
9 Thermal insulation layer
10 Aircraft component, aircraft gas turbine, external wall of aircraft
11 Additional heat exchange apparatus

12 Control apparatus
13 Pylon
14 Pipe coil
15 Propeller
16 Second heat exchange apparatus
20 Battery system, electric system
B Width of a channel for fluid
F Fluid flow
F1 First fluid flow (primary circuit)
F2 Second fluid flow (secondary circuit)
H Height of a channel for fluid
L Ambient air
L' Propeller flow
Q Heat flow

The invention claimed is:

1. An aircraft component, having a face over or around which ambient air flows, and
  a heat exchange apparatus including at least one heat exchange face, wherein the at least one heat exchange face is arranged to face externally, to be in contact with the ambient air;
  wherein the face of the aircraft component is positioned adjacent to and/or at least partly surrounds the at least one heat exchange face;
  wherein the heat exchange apparatus includes a thermal insulation layer positioned on a side of the heat exchange apparatus facing internally, away from the ambient air.

2. The aircraft component according to claim 1, wherein the face is configured to allow during operation of the aircraft component a convective heat exchange and/or a heat exchange via radiation.

3. The aircraft component according to claim 1, wherein the at least one heat exchange face terminates flush with the face of the aircraft component and/or is free from structure for increasing the heat exchange face.

4. The aircraft component according to claim 1, wherein the at least one heat exchange face has a same curvature and/or surface structure as the face of the aircraft component.

5. The aircraft component according to claim 1, wherein the face of the aircraft component is a housing surrounding a bypass channel of a gas turbine and the at least one heat exchange apparatus is arranged in the housing.

6. The aircraft component according to claim 1, wherein the face of the aircraft component is a housing of an aircraft gas turbine and the at least one heat exchange face is arranged in the housing axially between an inlet region and a thrust reversal region of the aircraft gas turbine.

7. The aircraft component according to claim 1, wherein the heat exchange face is part of the external wall of an aircraft.

8. The aircraft component according to claim 1, wherein the at least one heat exchange face is integrated in a region of the face of the aircraft component, which is formed from composite material.

9. The aircraft component according to claim 1, wherein the at least one heat exchange face includes or is formed from aluminum copper and/or magnesium.

10. The aircraft component according to claim 1, wherein the heat exchange apparatus includes at least one channel for a fluid, wherein the at least one channel is thermally coupled to the at least one heat exchange face.

11. The aircraft component according to claim 10, wherein the at least one channel is arranged in an axial direction of the aircraft gas turbine.

12. The aircraft component according to claim 10, wherein the heat exchange apparatus is configured as at least one channel of a counter-current heat exchanger or cross-flow heat exchanger.

13. The aircraft component according to claim 10, wherein the fluid is an oil, a lubricant, a coolant or a fuel.

14. The aircraft component according to claim 10, wherein the at least one channel has a rectangular cross section, with a ratio of height to width between 1:2 and 1:10.

15. The aircraft component according to claim 1, wherein the heat exchange apparatus is coupled for cooling to at least one electric or electronic unit in an aircraft gas turbine and/or aircraft.

16. The aircraft component according to claim 15, wherein the at least one at least one electric or electronic unit includes an apparatus for variable frequency energy supply.

17. The aircraft component according to claim 1, wherein a size of the at least one heat exchange face is between 0.07 and 0.30 m$^2$.

18. The aircraft component according to claim 1, wherein the heat exchange apparatus is thermally coupled to an additional heat exchange apparatus that is arranged at the side of the heat exchange apparatus facing internally away from the ambient air, and further comprising a control apparatus configured for adjusting a heat exchange between the heat exchange apparatus and the additional heat exchange apparatus in accordance with an operating parameter of the aircraft.

19. The aircraft component according to claim 1, wherein the at least one heat exchange face is arranged in a region of a flow which is generated by a propeller.

20. The aircraft component according to claim 1, wherein the at least one heat exchange face is thermally coupled to a secondary circuit of a second fluid which is thermally coupled to a primary circuit with a first fluid via a second heat exchange apparatus.

21. A method for operating heat exchange apparatuses in conjunction with an aircraft component with at least one heat exchange apparatus comprising:

providing:

an aircraft component, having a face over or around which ambient air flows, and a heat exchange apparatus including at least one heat exchange face wherein the at least one heat exchange face is arranged to face externally, to be in contact with the ambient air;

wherein the face of the aircraft component is positioned adjacent to and/or at least partly surrounds the at least one heat exchange face;

wherein the heat exchange apparatus includes a thermal insulation layer positioned on a side of the heat exchange apparatus facing internally away from the ambient air;

wherein the heat exchange apparatus is thermally coupled to an additional heat exchange apparatus that is arranged at the side of the heat exchange apparatus facing internally, away from the ambient air;

a control apparatus configured for adjusting heat exchange between the heat exchange apparatus and the additional heat exchange apparatus;

using the control apparatus to control the heat exchange in accordance with an operating parameter of the aircraft.

22. An aircraft component, having a face over or around which ambient air flows, and a heat exchange apparatus including at least one heat exchange face, wherein the at least one heat exchange face is arranged to face externally, to be in contact with the ambient air;

wherein the face of the aircraft component is positioned adjacent to and/or at least partly surrounds the at least one heat exchange face;

wherein the at least one heat exchange face is thermally coupled to a secondary circuit of a second fluid which is thermally coupled to a primary circuit with a first fluid via a second heat exchange apparatus.

\* \* \* \* \*